Oct. 3, 1950   M. C. MILLER, JR., ET AL   2,524,172
UNIVERSAL MOUNT
Filed Sept. 17, 1945   2 Sheets-Sheet 1
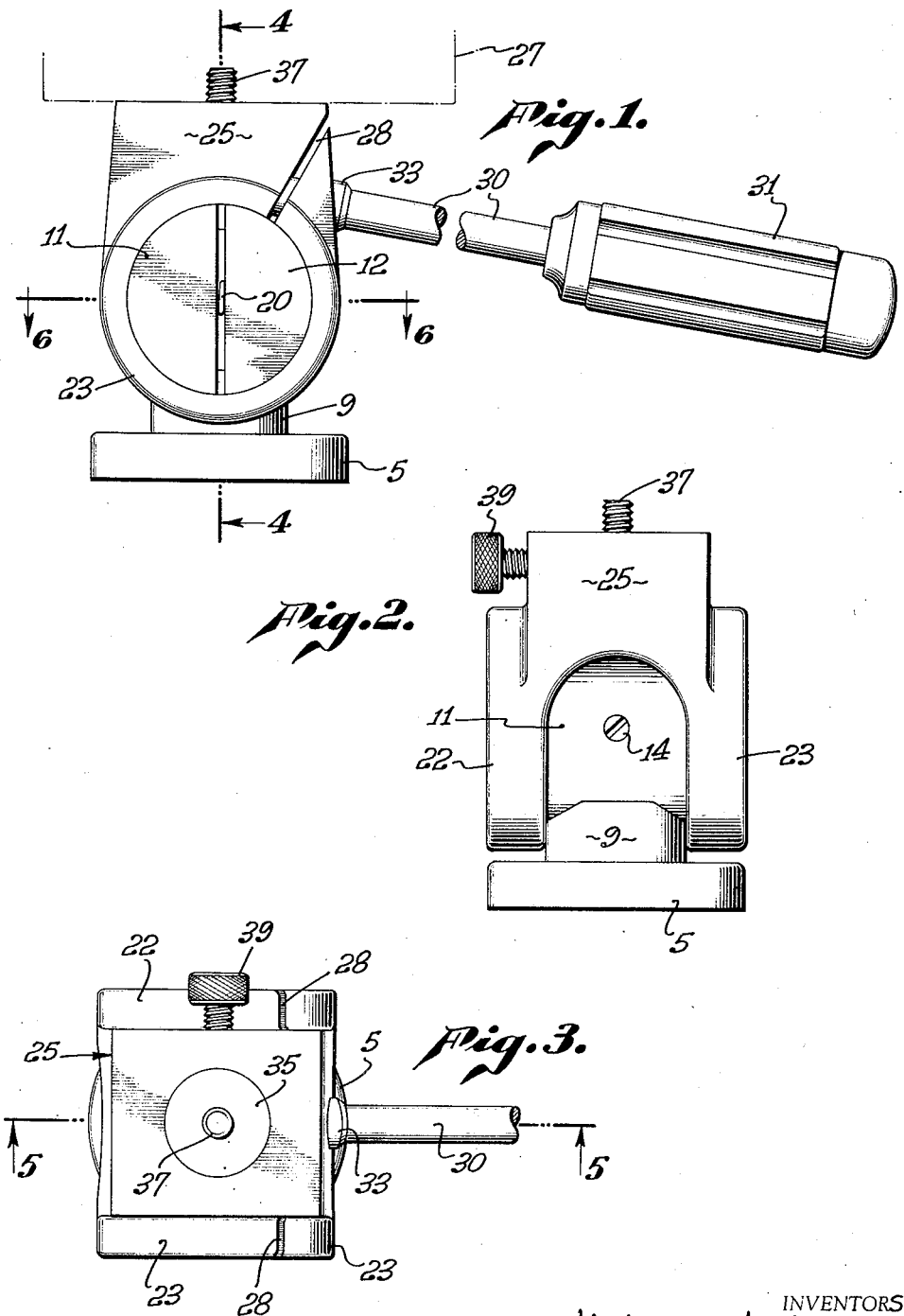
INVENTORS.
Milton C. Miller Jr.
John B. Lomek Oct. 3, 1950     M. C. MILLER, JR., ET AL     2,524,172
UNIVERSAL MOUNT
Filed Sept. 17, 1945     2 Sheets—Sheet 2
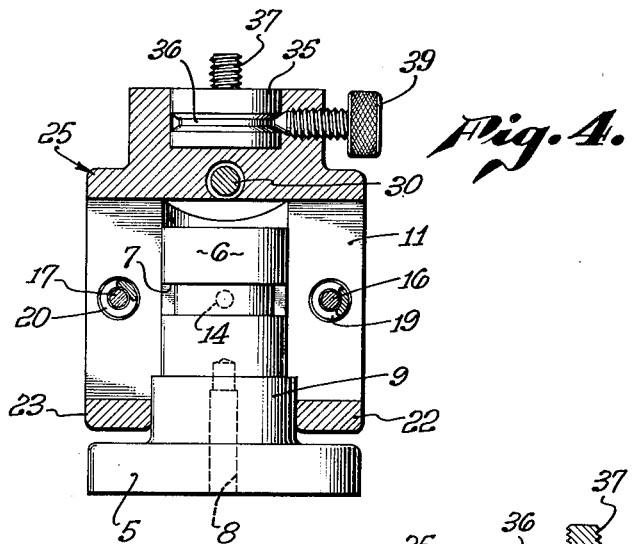
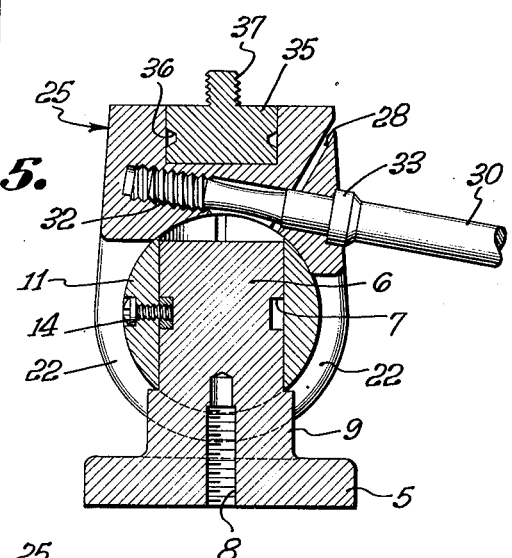
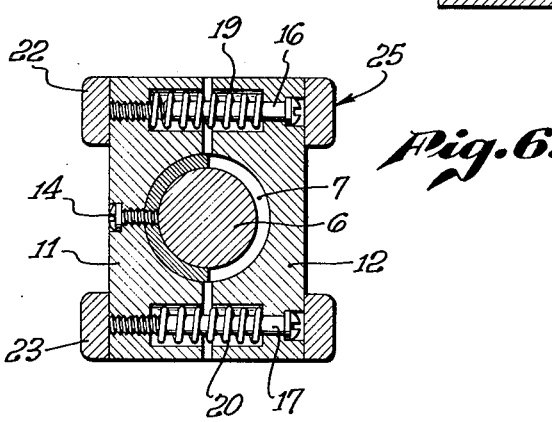
INVENTORS.
Milton C. Miller Jr.
John B. Louick Patented Oct. 3, 1950

2,524,172

UNITED STATES PATENT OFFICE 2,524,172

UNIVERSAL MOUNT

Milton C. Miller, Jr., Los Angeles, and John B. Lovick, Glendale, Calif., assignors to Trinity Manufacturing Company, Glendale, Calif.

Application September 17, 1945, Serial No. 616,806

5 Claims. (Cl. 248—179)

This invention relates to photographic camera apparatus, and particularly to a universal mounting or head for adjusting both the vertical and horizontal axes of a camera when mounted on a stand or tripod.

Universal camera mountings are well known in the art, the present invention being similar to a type now in use, wherein the axes of vertical and horizontal pivot members intersect and a single control arm or lever locks and unlocks both pivots. Although the general construction of the present invention is similar to such a mounting, the present invention is provided with a structure, which, instead of locking the vertical adjustment by exerting pressure on one end of a horizontal pivot to expand the other end of the horizontal pivot against a fixed diameter collar in the manner of the prior devices, directly exerts pressure on both ends of the horizontal pivot. Since the locking of the vertical adjustment in prior devices brings pressure to bear on the horizontal adjustment, the horizontal adjustment either becomes locked at the same time as the vertical adjustment or is, at least, partially locked. In the present invention, pressure is directly applied to the vertical adjustment without interfering with the horizontal adjustment, and thus, better control of the locking and unlocking of the two adjustments is obtained, and a more definite separation between the two adjustments is also obtained. In the present construction, when both adjustments are locked by the control member, it is only necessary to turn the control member a quarter of a turn to first unlock the horizontal adjustment, while maintaining the vertical adjustment locked, and then turn the control member another quarter of a turn to unlock the vertical adjustment.

Another feature of the present invention is in the means for attaching various types of cameras to the mounting, so that cameras having different types of mounting threads may be rapidly attached to and detached from the mounting.

The principal object of the invention, therefore, is to facilitate the manipulation of a camera on a stand or tripod.

Another object of the invention is to provide an improved universal head which has a single locking and unlocking member for controlling both vertical and horizontal adjustments in successive order.

A further object of the invention is to provide an improved universal camera mount which has a single locking element for directly locking and unlocking two adjustments of the mount in a successive order.

A still further object of the invention is to facilitate the attaching and detaching of a camera from its universal mounting.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 1 is a side elevational view of a universal mount embodying the invention.

Fig. 2 is a front elevational view of the universal mount shown in Fig. 1.

Fig. 3 is a top view of the universal mount shown in Figs. 1 and 2.

Fig. 4 is a cross sectional view taken along the line 4—4 of Fig. 1.

Fig. 5 is a cross sectional view taken along the line 5—5 of Fig. 3, and

Fig. 6 is a cross sectional view taken along the line 6—6 of Fig. 1.

Referring now to the drawings, in which the same numerals identify like elements, a circular base member 5 has a cylindrical upright post or pivot portion 6 with a center notch 7 therein, the post and base having a threaded hole 8 used for attaching the mount to a tripod or stand. A shoulder portion 9 is intermediate the pivot post 6 and base 5. Surrounding the post 6 are two half cylinder sections 11 and 12, which are recessed to accommodate the pivot 6, so that the end faces are adjacent and slightly separated from one another, section 11 having a set screw 14 threaded therein and passing into the notch 7 to prevent the sections from sliding off the post 6. (See Fig. 5.) The two sections 11 and 12 are fastened together at their ends by means of bolts 16 and 17 (see Fig. 6), the bolts passing through section 12 and being threaded in section 11. In enlarged holes in the face of sections 11 and 12 and surrounding the bolts 16 and 17, respectively, are a pair of compression springs 19 and 20, which bear against the ends of the enlarged holes and urge the sections apart. The two sections 11 and 12 provide a pivot for tilting the mounting vertically, and the post 6 provides a pivot for rotating the mounting horizontally, as will be explained hereinafter.

Surrounding the ends of the sections 11 and 12, are two collars 22 and 23, which are part of a casting 25 on top of which cameras are mounted. That is, the casting 25 forms the seat for cameras mounted thereon, as shown by the broken line 27 in Fig. 1. The casting 25 is split completely across, as shown by the notch 28, so that normally it is an open ring with respect to collars 22 and 23. The collars surround the ends of the sections 11 and 12, and the screws 16 and 17 are so adjusted that the springs 19 and 20 exert their maximum force to cause the outer end surfaces of the sections 11 and 12 to bear against the inner surfaces of the collars 22 and 23 and casting 25 when an adjusting rod 30 is in a certain predetermined longitudinal position. The rod 30 has a handle 31 at one end, threads 32 at the other end, and a collar or shoulder 33 adapted to bear against the smaller end of the split casting 25. The threaded end 32 of rod 30 passes through a hole in one end of the casting 25 between the collars 22 and 23, so that when the rod is turned and the shoulder 33 bears against the small, split end of the casting, it reduces the inside diameter of both collars 22 and 23 simultaneously. The rod 30 also serves as a tilting and panning control lever.

The first effect of the reduction in diameter of the collars is to exert pressure on the springs 19 and 20 without bringing any pressure to bear between the inner notched surfaces of the sections 11 and 12 and the outer surface of the post 6. Thus, the head may be adjusted horizontally, while the friction between the sections, the collars, and the casting is sufficient to hold the head in any vertical adjustment. A further tightening of the handle 30, however, will compress the springs 19 and 20, and bring the inner notched surfaces of sections 11 and 12 against the post 6 to lock the mount from rotating on the pivot post 6. In unlocking the device, approximately the first quarter of a turn permits the notch 28 to widen, the collars 22 and 23 to increase in diameter to release the sections 11 and 12 from the vertical pivot, while the springs 19 and 20 maintain the sections 11 and 12 in firm contact with the inner surfaces of the collars 22 and 23. Approximately another quarter turn of the handle 30, however, permits the notch 28 to widen sufficiently and the collars 22 and 23 to enlarge sufficiently in diameter so that the bolts 16 and 18 receive the pressure of the springs 19 and 20, which reduces the friction between the collars 22 and 23 and sections 11 and 12. The head may now be adjusted vertically on the horizontal pivot.

The upper face of the casting 25 is drilled with a circular recess into which is fitted a mounting bolt having a head 35 with a circumferential notch 36 therearound and a threaded portion or post 37. A thumb set screw 39 is adapted to be threaded through the casting 25 so that the tip of the screw enters the groove 36 to hold the bolt in place. A mounting bolt of this type may be provided for each camera, the threads being suited to the particular camera, while the heads are all the same so as to fit the mount. Thus, to change cameras, it is only necessary to unloosen the thumb set screw 39, remove the camera with its mounting bolt, and place another camera having a bolt with the same type of head on the mount. This not only permits a very rapid exchange of cameras, but prevents wear on the threads of any camera by attaching and detaching them from the mount in the usual manner.

By direct action of the control rod 30 against one end of the split casting 25, which is split completely across, successive locking and unlocking actions are obtained with a slight turning action of the rod 30. This adjustment can be made substantially a quarter of a turn of the rod or handle by the adjustment of the bolts 16 and 17 with respect to the internal diameters of the collars 22 and 23, the external diameter of the sections 11 and 12, the internal diameter of sections 11 and 12, and the diameter of the pivot post 6. By direct pressure on the split end of the casting 25, however, the locking and unlocking action for each adjustment may be very accurately controlled and distinctly separated.

We claim:

1. A universal mount comprising a vertical, cylindrical member, a pair of half cylinder members mounted on said vertical member, the flat surfaces of said half cylinder members facing one another and being notched to surround said vertical member, a casting having ring portions surrounding the ends of said half cylinder members, said casting being split along its length, a rotatable rod passing through substantially the center of one split end of said casting and threadedly engaged in the central portion of the other split end for drawing the ends of said casting together and simultaneously decreasing the internal diameter of said ring portions, resilient means between the ends of said half cylinder members urging them apart and from contact with said vertical member until the rotation of said rod overcomes the tension of said resilient means, said vertical member being circumferentially notched, screw means passing through one of said half cylinder members and into said notch, and screw means between the ends of said half cylinder members to limit the separation of said half cylinder members by said resilient means.

2. A universal mount comprising a vertical, cylindrical member, a pair of half cylinder members mounted on said vertical member, the flat surfaces of said half cylinder members facing one another and being notched to surround said vertical member, a casting having ring portions surrounding the ends of said half cylinder members, said casting being split along its length, means passing through substantially the center of one split end of said casting and threadedly engaged in the central portion of the other split end for drawing the ends of said casting together and simultaneously decreasing the internal diameter of said ring portions, and springs for urging the flat surfaces of said half cylinder members apart to a predetermined distance dependent upon the internal diameter of said ring portions of said casting.

3. A universal mount comprising a base having a cylindrical post extending therefrom, a plural section horizontal pivot member mounted on said post, a casting mounted on said horizontal pivot, a rotatable rod attached to said casting, and means interconnecting said plural sections of said horizontal pivot member, said means permitting the rotation of said rod a predetermined amount in a certain direction to increase the friction between said casting and said plural sections of said horizontal pivot member only, further rotation of said rod increasing the friction between said plural sections of said horizontal pivot member and said post, said plural section horizontal member including two notched half cylinder sections surrounding said post, said means including a pair of bolts interconnecting said plural sections and a pair of springs urging said sections apart.

4. A universal mount comprising a vertical, cylindrical post, a horizontal, cylindrical pivot consisting of two half cylinder sections having central notches therein surrounding said vertical post, the flat surfaces of said half cylinder sections being positioned adjacent and facing one another, said surfaces having opposing cylindrical openings therein, bolts in said openings and adapted to permit said half cylinder members to be separated a predetermined distance to eliminate substantially all friction between the notched portions of said cylindrical members and said post, and means surrounding the ends of said half cylinder members for urging said half cylinder members together for causing friction between said post and said half cylinder members, and means in said openings to produce friction between the external surface of said half cylinder members and said last mentioned means when substantially no friction exists between said half cylinder members and said post.

5. A universal mount comprising a vertical, cylindrical member, a pair of half cylinder members mounted on said vertical member, the flat surfaces of said half cylinder members facing one another and being notched to surround said vertical member, a casting having ring portions surrounding the ends of said half cylinder members, said casting being split along its length, means passing through substantially the center of one split end of said casting and threadedly engaged in the central portion of the other split end for drawing the ends of said casting together and simultaneously decreasing the internal diameter of said ring portions, one end of each of said half cylinder members being drilled and the other ends of said half cylinder members being threaded, screws being provided in said drilled and threaded portions to permit separation of said half cylinder members a predetermined distance, and springs being provided on said screws to urge said half cylinder members to said predetermined distance.

MILTON C. MILLER, JR.
JOHN B. LOVICK.

REFERENCES CITED

The following references are of record in the file of this patent:

UNITED STATES PATENTS

| Number | Name | Date |
| --- | --- | --- |
| 50,593 | Jackson | Oct. 24, 1865 |
| 299,886 | Westbrook | June 3, 1884 |
| 913,056 | Rounds | Feb. 23, 1909 |
| 1,854,951 | Neuwirth | Apr. 19, 1932 |
| 2,143,606 | Mooney | Jan. 10, 1939 |
| 2,318,633 | Ries | May 11, 1943 |